(12) United States Patent
Moghaddam Sardroud et al.

(10) Patent No.: US 12,494,863 B2
(45) Date of Patent: Dec. 9, 2025

(54) MULTI-FREQUENCY BASED DATA SENDING METHOD AND APPARATUS, AND MULTI-FREQUENCY BASED DATA RECEIVING METHOD

(71) Applicant: SHENZHEN ZHI HUI LIN NETWORK TECHNOLOGY CO., LTD., Shenzhen Guangdong (CN)

(72) Inventors: Behzad Moghaddam Sardroud, Shenzhen Guangdong (CN); Behzad Kalantari, Shenzhen Guangdong (CN); Hamed Kalantari, Shenzhen Guangdong (CN); Xiaoduan Ding, Shenzhen Guangdong (CN); Yan Yin, Shenzhen Guangdong (CN); Kun Huang, Shenzhen Guangdong (CN)

(73) Assignee: SHENZHEN ZHI HUI LIN NETWORK TECHNOLOGY CO., LTD., Shenzhen Guangdong (CN)

( * ) Notice: Subject to any disclaimer, the term of this patent is extended or adjusted under 35 U.S.C. 154(b) by 120 days.

(21) Appl. No.: 18/718,659

(22) PCT Filed: Sep. 22, 2022

(86) PCT No.: PCT/CN2022/120526
§ 371 (c)(1),
(2) Date: Jun. 11, 2024

(87) PCT Pub. No.: WO2023/061180
PCT Pub. Date: Apr. 20, 2023

(65) Prior Publication Data
US 2025/0055593 A1    Feb. 13, 2025

(30) Foreign Application Priority Data

Oct. 12, 2021 (CN) .......................... 202111191391.6

(51) Int. Cl.
*H04L 1/00* (2006.01)
*H04L 43/0888* (2022.01)

(52) U.S. Cl.
CPC ........ *H04L 1/0007* (2013.01); *H04L 43/0888* (2013.01)

(58) Field of Classification Search
CPC . H04L 1/0007; H04L 43/0888; H04L 1/0006; H04L 43/0882; H04L 43/0894;
(Continued)

(56) References Cited

U.S. PATENT DOCUMENTS

| | | | |
|---|---|---|---|
| 8,467,367 B2 * | 6/2013 | Malladi | ................ H04L 1/0072 370/537 |
| 2003/0076248 A1 | 4/2003 | Larson | |
| 2003/0193913 A1 | 10/2003 | Murata et al. | |
| 2011/0141988 A1 * | 6/2011 | Park | ..................... H04L 1/1671 370/329 |

(Continued)

FOREIGN PATENT DOCUMENTS

| | | |
|---|---|---|
| CN | 105281877 A | 1/2016 |
| CN | 107645343 A | 1/2018 |
| CN | 108988958 A | 12/2018 |
| CN | 111865952 A | 10/2020 |

(Continued)

OTHER PUBLICATIONS

International Search Report dated Dec. 6, 2022 issued in PCT/CN2022/120526.
(Continued)

*Primary Examiner* — Khanh C Tran
(74) *Attorney, Agent, or Firm* — Scully, Scott, Murphy & Presser, P.C.

(57) ABSTRACT

A multi-frequency based data sending method includes: obtaining data to-be-sent; obtaining binary data by performing binary conversion on the data to-be-sent; obtaining at
(Continued)

least one data fragment by performing data segmentation on the binary data; determining at least one sending frequency according to the number of bits of each data fragment; determining a sending frequency corresponding to each data fragment from the at least one sending frequency according to an arrangement position of each data fragment in the binary data; obtaining at least one conversion result by performing data conversion on each data fragment according to a preset conversion table and the sending frequency corresponding to each data fragment; and sending each conversion result to a data receiving end in order at the sending frequency corresponding to each conversion result.

13 Claims, 5 Drawing Sheets

(58) Field of Classification Search
CPC ... H04L 1/0008; H04L 1/0002; H04L 1/0003; H04L 1/0005; H04L 1/0004; H04L 1/0009; H04L 1/0013; H04L 1/0011; H04L 1/001
See application file for complete search history.

(56) References Cited

U.S. PATENT DOCUMENTS

| | | | |
|---|---|---|---|
| 2015/0382352 A1 | 12/2015 | Dupont | |
| 2021/0288748 A1* | 9/2021 | Li | H04L 1/0023 |
| 2024/0137147 A1* | 4/2024 | Jin | H04L 1/0013 |

FOREIGN PATENT DOCUMENTS

| | | |
|---|---|---|
| CN | 114064308 A | 2/2022 |
| KR | 20180067956 A | 6/2018 |
| WO | 2021189902 A1 | 9/2021 |

OTHER PUBLICATIONS

CN First Office Action dated May 27, 2023 issued in CN 202111191391.6.
Rejection Decision dated Feb. 5, 2024 issued in CN 202111191391.6.

* cited by examiner

MULTI-FREQUENCY BASED DATA SENDING METHOD AND APPARATUS, AND MULTI-FREQUENCY BASED DATA RECEIVING METHOD

CROSS-REFERENCE TO RELATED APPLICATIONS

This application is a U.S. national phase application of PCT/CN2022/120526 filed on Sep. 22, 2022, which claims priority to Chinese Patent Application No. 202111191391.6, entitled "MULTI-FREQUENCY BASED DATA SENDING METHOD, DEVICE AND APPARATUS, AND MULTI-FREQUENCY BASED DATA RECEIVING METHOD, DEVICE AND APPARATUS", and filed Oct. 12, 2021, the entire contents of each of which are incorporated herein by reference for all purposes.

TECHNICAL FIELD

This application relates to the field of data transmission technology, and particularly to a multi-frequency based data sending method, device and apparatus, and a multi-frequency based data receiving method, device and apparatus.

BACKGROUND

Currently, when transmitting data, in order to obtain higher transmission efficiency, the data is generally compressed or split into multiple sub-data with the same size for transmission. For existing compression technology, data compression generally consumes a large amount of computer resources for massive calculations, but due to the increased bandwidth of modern routers, sending data directly without compression generally takes less time than sending said data subject to compression. For existing data splitting method, data is generally split into multiple sub-data with a same size according to a specific transmission requirement and then the multiple sub-data are sent respectively, and the multiple sub-data are combined at a receiving end. However, in fact, due to problems of the sub-data obtained after splitting such as disk writing and indexing in a disk cluster, data splitting is unable to improve data transmission on the network, but instead leads to a lower data transmission speed on the network. Therefore, the existing data sending method based on compression and splitting fails to increase the data transmission speed on the network, but instead leads to a lower data transmission speed.

SUMMARY

In order to solve the above problems existing in the related art, embodiments of the disclosure provides a multi-frequency based data sending method, device and apparatus, and a multi-frequency based data receiving method, device and apparatus, which can increase a data transmission speed on the network.

In a first aspect, embodiments of the disclosure provide a multi-frequency based data sending method. The multi-frequency based data sending method includes: obtaining data to-be-sent; obtaining binary data by performing binary conversion on the data to-be-sent; obtaining at least one data fragment by performing data segmentation on the binary data; determining at least one sending frequency according to the number of bits of each of the at least one data fragment; determining a sending frequency corresponding to each of the at least one data fragment from the at least one sending frequency according to an arrangement position of each of the at least one data fragment in the binary data; obtaining at least one conversion result by performing data conversion on each of the at least one data fragment according to a preset conversion table and the sending frequency corresponding to each of the at least one data fragment, the conversion table recording conversion results corresponding to different data fragments at different sending frequencies, and the at least one conversion result being in one-to-one correspondence with the at least one data fragment; and sending each of the at least one conversion result to a data receiving end in order at the sending frequency corresponding to each of the at least one conversion result.

In a second aspect, embodiments of the disclosure provide a multi-frequency based data receiving method. The multi-frequency based data receiving method includes: receiving at least one data to-be-converted from a data sending end, each of the at least one data to-be-converted containing a conversion result and a description file; determining, according to the description file, a sending frequency and an index corresponding to each conversion data; obtaining at least one data fragment by performing inverse conversion on a conversion result corresponding to each conversion data according to a preset conversion table and a sending frequency of each conversion data, the conversion table recording conversion results corresponding to different data fragments at different sending frequencies, and the at least one data fragment being in one-to-one correspondence with at least one conversion result; and obtaining original data by arranging and combining the at least one data fragment according to the index corresponding to each of the at least one data fragment.

In a third aspect, embodiments of the disclosure provide a multi-frequency based data sending device. The multi-frequency based data sending device includes a first receiving module, a first processing module, a first conversion module, and a sending module. The first receiving module is configured to obtain data to-be-sent. The first processing module is configured to obtain binary data by performing binary conversion on the data to-be-sent, obtain at least one data fragment by performing data segmentation on the binary data, determine at least one sending frequency according to the number of bits of each of the at least one data fragment, and determine a sending frequency corresponding to each of the at least one data fragment from the at least one sending frequency according to an arrangement position of each of the at least one data fragment in the binary data. The first conversion module is configured to obtain at least one conversion result by performing data conversion on each of the at least one data fragment according to a preset conversion table and the sending frequency corresponding to each of the at least one data fragment, the conversion table recording conversion results corresponding to different data fragments at different sending frequencies, and the at least one conversion result being in one-to-one correspondence with the at least one data fragment. The sending module is configured to send each of the at least one conversion result to a data receiving end in order at the sending frequency corresponding to each of the at least one conversion result.

In a fourth aspect, embodiments of the disclosure provide a multi-frequency based data receiving device. The multi-frequency based data receiving device includes a second receiving module, a second processing module, a second conversion module, and a restoration module. The second receiving module is configured to receive at least one data to-be-converted from a data sending end, each of the at least one data to-be-converted containing a conversion result and a description file. The second processing module is configured to determine, according to the description file, a sending frequency and an index corresponding to each conversion data. The second conversion module is configured to obtain at least one data fragment by performing inverse conversion on a conversion result corresponding to each conversion data according to a preset conversion table and a sending frequency of each conversion data, the conversion table recording conversion results corresponding to different data fragments at different sending frequencies, and the at least one data fragment being in one-to-one correspondence with at least one conversion result. The restoration module is configured to obtain original data by arranging and combining the at least one data fragment according to the index corresponding to each of the at least one data fragment.

In a fifth aspect, embodiments of the disclosure provide a multi-frequency based data sending apparatus. The multi-frequency based data sending apparatus includes a processor and a memory. The processor is connected with the memory. The memory stores computer programs. The processor is configured to execute the computer programs stored in the memory to cause an electronic device to execute the method of the first aspect.

In a sixth aspect, embodiments of the disclosure provide a multi-frequency based data receiving apparatus. The multi-frequency based data receiving apparatus includes a processor and a memory. The processor is connected with the memory. The memory stores computer programs. The processor is configured to execute the computer programs stored in the memory to cause an electronic device to execute the method of the second aspect.

In a seventh aspect, embodiments of the disclosure provide a computer-readable storage medium. The computer-readable storage medium stores computer programs which are operable with a computer to execute the method of the first aspect and/or the second aspect.

In an eighth aspect, embodiments of the disclosure provide a computer program product. The computer program product includes a non-transitory computer-readable storage medium storing computer programs. The computer programs are operable with a computer to execute the method of the first aspect and/or the second aspect.

The embodiments of the disclosure have the following advantageous effects.

In the embodiment of the disclosure, the data to-be-sent is binarized, the binarized data is segmented, and the at least one sending frequency is determined according to the number of bits of each of the at least one data fragment obtained through segmentation; the sending frequency corresponding to each of the at least one data fragment is determined according to the arrangement position of each of the at least one data fragment in the binary data; each of the at least one data fragment is converted according to the preset conversion table and the sending frequency corresponding to each of the at least one data fragment, and a result of data conversion is sent to the data receiving end at the corresponding sending frequency. In the disclosure, multiple sending frequencies are introduced, so that conversion results can be reused during data conversion, that is, for different sending frequencies, the conversion results can correspond to different data fragments. In this case, the conversion results can be reused while streamlining the original data, thereby reducing complexity of the conversion table and a conversion rule, effectively reducing the number and size of files transmitted in network data transmission, and further increasing a transmission speed on the network. In addition, since a storage unit, such as a random access memory (RAM), can process bits at the original size during data transmission, data processing is generally completed by a storage unit at the sending end and a storage unit at the receiving end. In the disclosure, the data to-be-sent is converted into binary data, which can realize bit alignment of the data, so that no additional memory is occupied at the sending end and the receiving end, thereby avoiding disk writing and indexing in a disk cluster required by data splitting, and further increasing the transmission speed on the network.

BRIEF DESCRIPTION OF THE DRAWINGS

In order to describe technical solutions of embodiments of the disclosure more clearly, the following will give a brief description of accompanying drawings used for describing the embodiments. Apparently, accompanying drawings described below are merely some embodiments. Those of ordinary skill in the art can also obtain other accompanying drawings based on the accompanying drawings described below without creative efforts.

DETAILED DESCRIPTION

Hereinafter, technical solutions of embodiments of the disclosure will be described clearly and completely with reference to accompanying drawings in the embodiments. Apparently, embodiments described below are merely some embodiments, rather than all embodiments of the disclosure. All other embodiments obtained by those of ordinary skill in the art based on the embodiments described below without creative efforts shall fall within the protection scope of the disclosure.

The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "embodiment" referred to herein means that particular features, structures, or properties described in conjunction with the embodiments may be defined in at least one embodiment of the disclosure. The phrase "embodiment" appearing in various places in the specification does not necessarily refer to the same embodiment or an independent/alternative embodiment that is mutually exclusive with other embodiments. Those skilled in the art will understand expressly and implicitly that an embodiment described herein may be combined with other embodiments.

Figure 1:
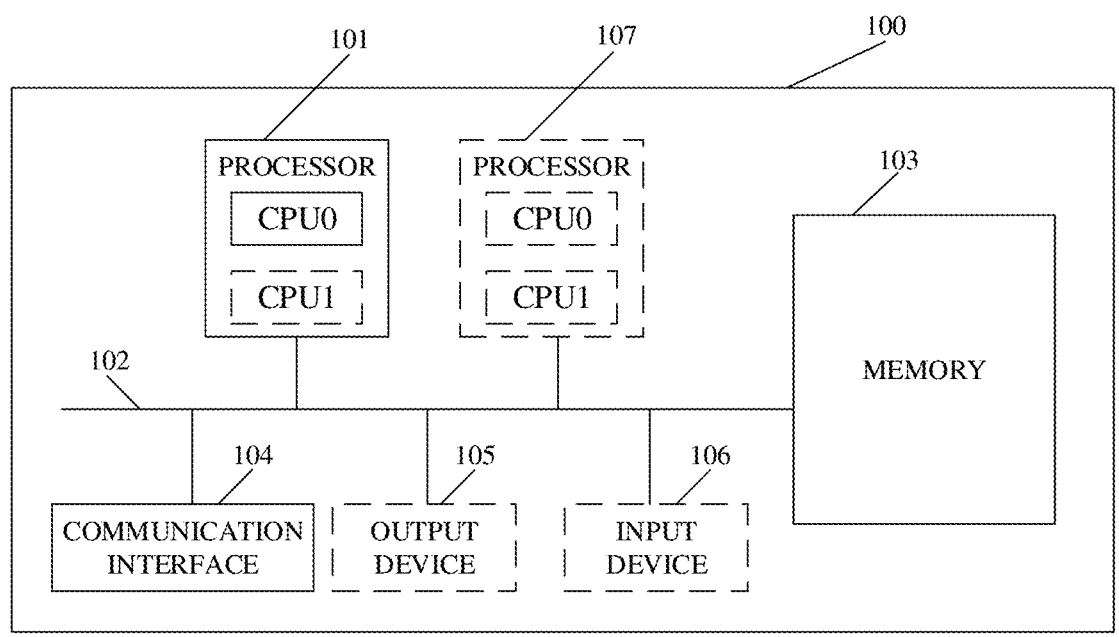
FIG. 1 is a schematic diagram illustrating a hardware structure of a multi-frequency based data sending device or a multi-frequency based data receiving device provided in embodiments of the disclosure.

Referring to FIG. 1, FIG. 1 is a schematic diagram illustrating a hardware structure of a multi-frequency based data sending device or a multi-frequency based data receiving device provided in embodiments of the disclosure. The multi-frequency based data sending device or the multi-frequency based data receiving device includes at least one processor 101, a communication line 102, a memory 103, and at least one communication interface 104.

In these embodiments, the processor 101 may be a central processing unit (CPU), a microprocessor, an application-specific integrated circuit (ASIC), or one or more integrated circuits for controlling execution of programs corresponding to solutions of the disclosure.

The communication line 102 may include a path for information transmission among the above-mentioned components.

The communication interface 104 may be any transceiver device (e.g., an antenna), and is configured to communicate with other devices or communication networks, such as the Ethernet, the radio access network (RAN), the wireless local area network (WLAN), etc.

The memory 103 may be, but is not limited to, a read-only memory (ROM) or other types of static storage devices that can store static information and instructions, a random access memory (RAM) or other types of dynamic storage devices that can store information and instructions, and may also be an electrically erasable programmable ROM (EEPROM), a compact disc ROM (CD-ROM) or other compact disc storage, optical disc storage (including compact disc, laser disc, optical disc, digital versatile disc, Blu-ray disc, etc.), a magnetic disk storage medium or other magnetic storage devices, or any other medium capable of carrying or storing desired program codes in the form of instructions or data structures and capable of being accessed by a computer.

In these embodiments, the memory 103 may exist independently and be connected with the processor 101 through the communication line 102. The memory 103 may also be integrated with the processor 101. The memory 103 of embodiments of the disclosure is generally non-volatile. The memory 103 is used to store computer execution instructions for executing solutions of the disclosure, and is controlled by the processor 101 for execution. The processor 101 is configured to execute the computer execution instructions stored in the memory 103, to implement the method of the following embodiments of the disclosure.

In an optional embodiment, the computer execution instructions can also be called application codes, which are not limited in the disclosure.

In an optional embodiment, the processor 101 may include one or more CPUs. For example, in FIG. 1, the processor 101 includes CPU0 and CPU1.

In an optional embodiment, the multi-frequency based data sending device or the multi-frequency based data receiving device may also include multiple processors. For example, in FIG. 1, the device includes a processor 101 and a processor 107. Each of these processors may be a single-CPU processor or a multi-CPU processor. The processor herein may refer to one or more devices, circuits, and/or processing cores for processing data (e.g., computer program instructions).

In an optional embodiment, the multi-frequency based data sending device or the multi-frequency based data receiving device is a server. In this case, the device may also include an output device 105 and an input device 106. The output device 105 communicates with the processor 101 and can display information in a variety of ways. For example, the output device 105 may be a liquid crystal display (LCD), a light-emitting diode (LED) display device, a cathode ray tube (CRT) display device, or a projector, etc. The input device 106 communicates with processor 101 and can receive user input in a variety of ways. For example, the input device 106 may be a mouse, a keyboard, a touch screen device, or a sensing device, etc.

The multi-frequency based data sending device and the multi-frequency based data receiving device each may be a general-purpose device or a special-purpose device, and the type of the device is not limited in embodiments of the disclosure.

A multi-frequency based data sending method disclosed in the disclosure will be depicted below.

Figure 2:
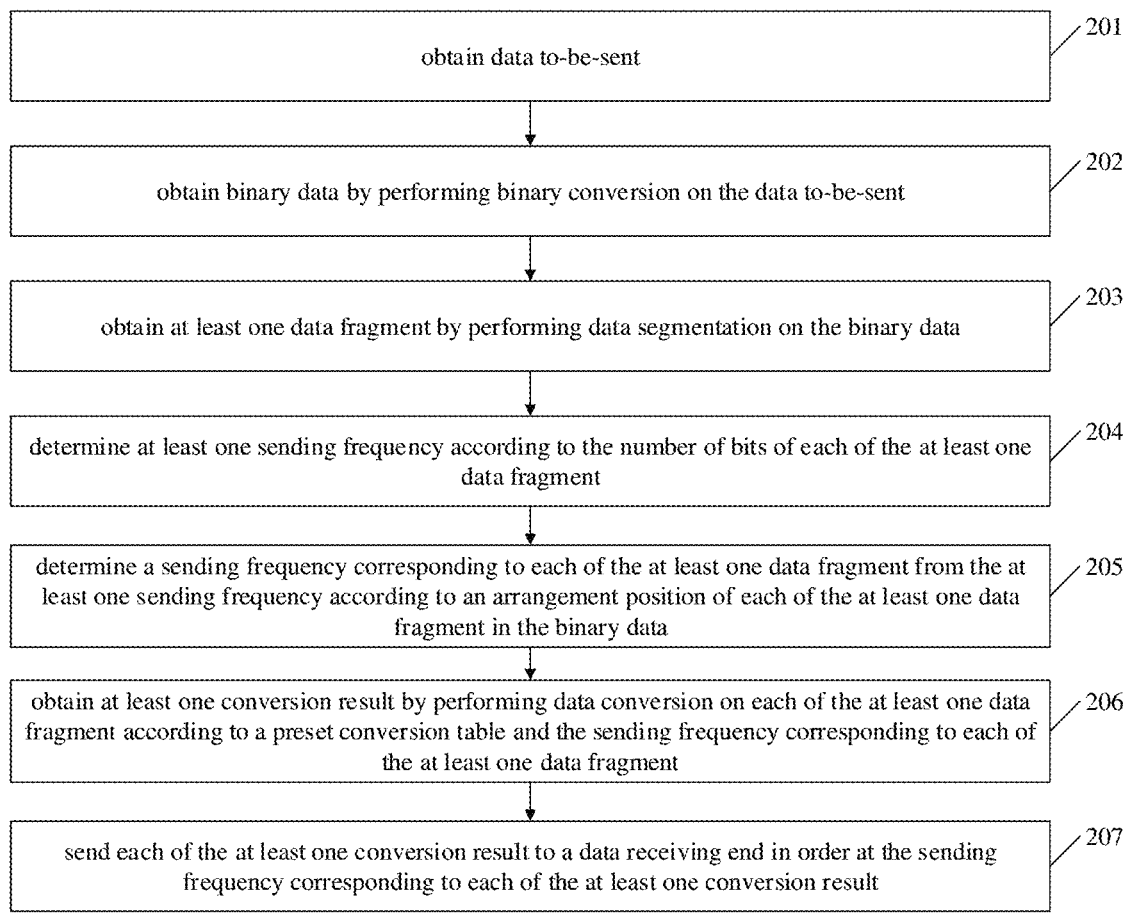
FIG. 2 is a schematic flowchart illustrating a multi-frequency based data sending method provided in embodiments of the disclosure.

Referring to FIG. 2, FIG. 2 is a schematic flowchart illustrating a multi-frequency based data sending method provided in embodiments of the disclosure. The multi-frequency based data sending method includes the following.

201, obtain data to-be-sent.

202, obtain binary data by performing binary conversion on the data to-be-sent.

203, obtain at least one data fragment by performing data segmentation on the binary data.

In these embodiments, a segmentation bit number n (i.e., the quantity of bits of data after splitting) is determined, and then the binary data is split into at least one data fragment with same number of bits according to the segmentation bit number n. As an example, n is any integer greater than 1. In these embodiments, the multi-frequency based data sending method provided in the disclosure will be described in combination with an exemplary situation where n is equal to 2.

Specifically, when n is equal to 2, it means that the segmentation bit number is set to 2. In this case, data segmentation is performed so that every 2 bits of the binary data are classified as one group. The binary data for example is "11010101", when the segmentation bit number is 2, the binary data can be split into [11, 01, 01, 01].

In optional embodiments, the segmentation bit number may also be a dynamic and cyclic value. For instance, the segmentation bit number is a segmentation sequence [m, x, y]. When performing data segmentation on the binary data, perform m-bit segmentation, perform x-bit segmentation, perform y-bit segmentation, perform m-bit segmentation, and so on, until segmentation of the binary data is completed. Specifically, if the segmentation sequence is [1, 2, 3] and the binary data is "110101011010", a segmentation result can be obtained as [1, 10, 101, 0, 11, 010].

204, determine at least one sending frequency according to the number of bits of each of the at least one data fragment.

In these embodiments, the number of required sending frequencies (i.e., first quantity) is first determined according to the number of bits of each of the at least one data fragment. As an example, the first quantity is the same as the number of bits of each of the at least one data fragment, that is, the first quantity is equal to n. The first quantity and the number of bits of each of the at least one data fragment may also satisfy other functional relationships. In a possible embodiment, the relationship between the first quantity k and the number n of bits of each of the at least one data fragment can be expressed by formula ①:

$$k = 2^n \qquad 1$$

In these embodiments, the multi-frequency based data sending method provided in the disclosure will be described in combination with an exemplary situation where the first quantity is equal to n. Following the above example where n is equal to 2, it can be determined that the first quantity is also 2. Therefore, 2 sending frequencies can be randomly selected from a preset sending-frequency library as the at least one sending frequency.

205, determine a sending frequency corresponding to each of the at least one data fragment from the at least one sending frequency according to an arrangement position of each of the at least one data fragment in the binary data.

In these embodiments, the at least one sending frequency obtained at 204 can be sorted randomly, and according to an arrangement position of each of the at least one data fragment in the binary data, one sending frequency can be selected sequentially and cyclically from the sorted at least one sending frequency as the sending frequency corresponding to each data fragment.

Specifically, following the above example where n is equal to 2, in this example, 2 sending frequencies (i.e., sending frequency A and sending frequency B) are selected, and a sequence [sending frequency A, sending frequency B] is obtained after sorting the 2 sending frequencies. A data-fragment sequence corresponding to the binary data "11010101" is [11, 01, 01, 01]. Based on this, it is determined that the 1st data fragment "11" corresponds to sending frequency A, the 2nd data fragment "01" corresponds to sending frequency B, the 3rd data fragment "01" corresponds to sending frequency A, and the 4th data fragment "01" corresponds to sending frequency B.

206, obtain at least one conversion result by performing data conversion on each of the at least one data fragment according to a preset conversion table and the sending frequency corresponding to each of the at least one data fragment.

In these embodiments, the conversion table records conversion results corresponding to different data fragments at different sending frequencies, where the at least one conversion result is in one-to-one correspondence with the at least one data fragment.

Specifically, following the above example where n is equal to 2, in this example, the conversion table is shown in Table 1:

TABLE 1

|  | sending frequency A | sending frequency B |
| --- | --- | --- |
| 11 | 1 | 0 |
| 00 | 0 | 1 |
| 01 | 0 | 1 |
| 10 | 1 | 0 |

By querying Table 1, a conversion result corresponding to each data fragment in the data-fragment sequence [11, 01, 01, 01] at a corresponding sending frequency can be determined, as detailed below:

11=>1 (at sending frequency A);
01=>1 (at sending frequency B);
01=>0 (at sending frequency A);
01=>1 (at sending frequency B);

Based on this, a conversion-result sequence [1, 1, 0, 1] can be obtained. As such, the number of bits of data after conversion is only half the number of bits of original data, which reduces the size of the data to-be-sent by 50%, thereby further improving the transmission efficiency on the network.

207, send each of the at least one conversion result to a data receiving end in order at the sending frequency corresponding to each of the at least one conversion result.

Figure 3:
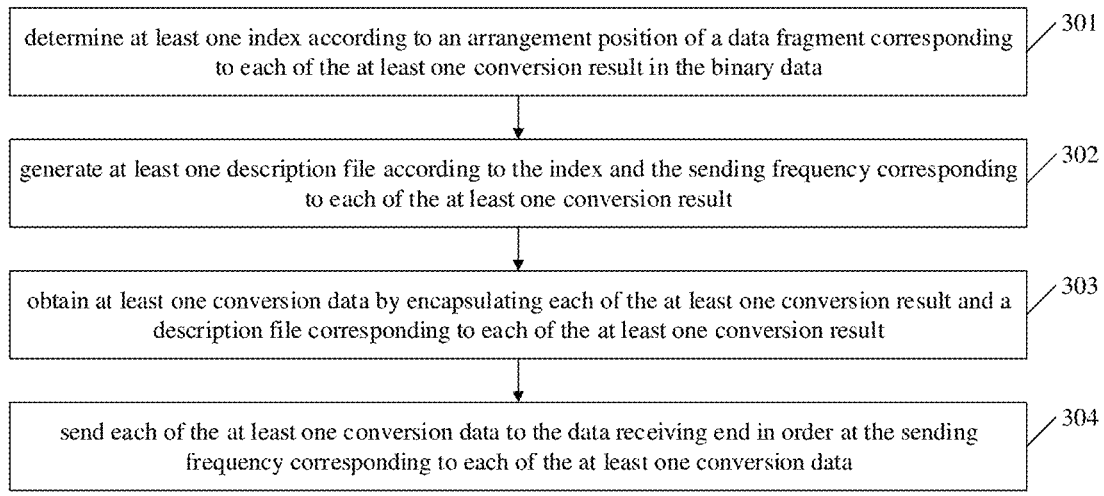
FIG. 3 is a schematic flowchart illustrating details of sending each of at least one conversion result to a data receiving end in order at a sending frequency corresponding to each of the at least one conversion result provided in embodiments of the disclosure.

In these embodiments, details of sending each of the at least one conversion result to the data receiving end in order at the sending frequency corresponding to each of the at least one conversion result are further provided. As illustrated in FIG. 3, said details include the following.

301, determine at least one index according to an arrangement position of a data fragment corresponding to each of the at least one conversion result in the binary data.

In these embodiments, the at least one index is in one-to-one correspondence with the at least one conversion result. Specifically, following the above example, for the conversion-result sequence [1, 1, 0, 1], an index of conversion result "1" at the first position is 1, an index of conversion result "1" at the second position is 2, an index of conversion result "0" at the third position is 3, and an index of conversion result "1" at the fourth position is 4.

302, generate at least one description file according to the index and the sending frequency corresponding to each of the at least one conversion result.

In these embodiments, the description file is used to record a name of the sending frequency corresponding to each of the at least one conversion result and an arrangement position of each of the at least one conversion result in the data to-be-sent, and the at least one description file is in one-to-one correspondence with the at least one conversion result.

Exemplarily, the description file may also contain information such as file size, file name, file format, and file hash value, where the file hash value can be used to compare to determine correctness of the decoded file, so as to ensure consistency of data before and after transmission.

303, obtain at least one conversion data by encapsulating each of the at least one conversion result and a description file corresponding to each of the at least one conversion result.

304, send each of the at least one conversion data to the data receiving end in order at the sending frequency corresponding to each of the at least one conversion data.

Figure 4:
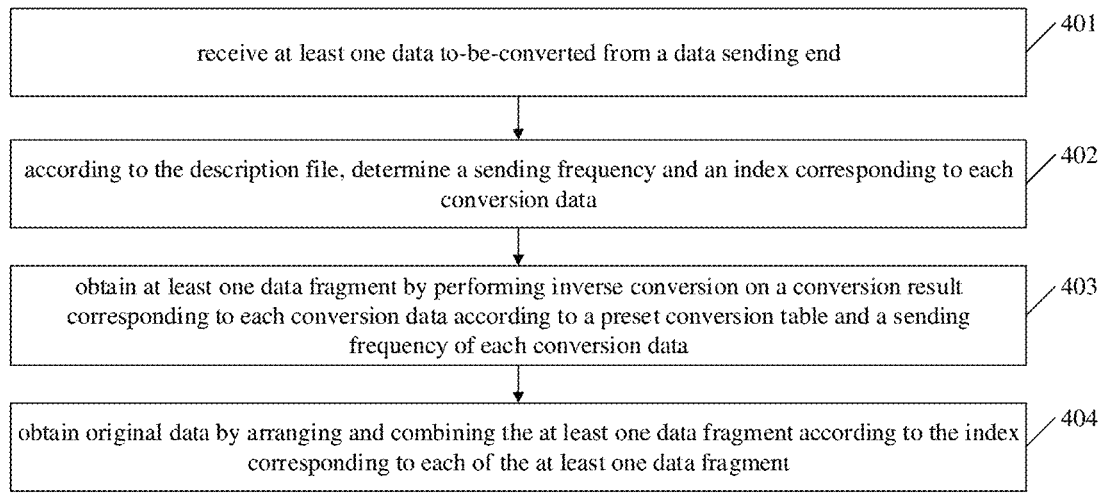
FIG. 4 is a schematic flowchart illustrating a multi-frequency based data receiving method provided in embodiments of the disclosure.

Further, referring to FIG. 4, FIG. 4 a schematic flowchart illustrating a multi-frequency based data receiving method provided in embodiments of the disclosure. The multi-frequency based data receiving method includes the following.

401, receive at least one data to-be-converted from a data sending end.

In these embodiments, each of the at least one data to-be-converted contains a conversion result and a description file.

402, according to the description file, determine a sending frequency and an index corresponding to each conversion data.

403, obtain at least one data fragment by performing inverse conversion on a conversion result corresponding to each conversion data according to a preset conversion table and a sending frequency of each conversion data.

In these embodiments, the conversion table records conversion results corresponding to different data fragments at different sending frequencies, and the at least one data fragment is in one-to-one correspondence with at least one conversion result.

404, obtain original data by arranging and combining the at least one data fragment according to the index corresponding to each of the at least one data fragment.

In sum, in the multi-frequency based data sending method provided in the disclosure, the data to-be-sent is binarized, the binarized data is segmented, and the at least one sending frequency is determined according to the number of bits of each of the at least one data fragment obtained through segmentation; the sending frequency corresponding to each of the at least one data fragment is determined according to the arrangement position of each of the at least one data fragment in the binary data; each of the at least one data fragment is converted according to the preset conversion table and the sending frequency corresponding to each of the at least one data fragment, and a result of data conversion is sent to the data receiving end at the corresponding sending frequency. In the disclosure, multiple sending frequencies are introduced, so that conversion results can be reused during data conversion, that is, for different sending frequencies, the conversion results can correspond to different data fragments. In this case, the conversion results can be reused while streamlining the original data, thereby reducing complexity of the conversion table and a conversion rule, effectively reducing the number and size of files transmitted in network data transmission, and further increasing a transmission speed on the network. In addition, since a storage unit, such as a RAM, can process bits at the original size during data transmission, data processing is generally completed by a storage unit at the sending end and a storage unit at the receiving end. In the disclosure, the data to-be-sent is converted into binary data, which can realize bit alignment of the data, so that no additional memory is occupied at the sending end and the receiving end, thereby avoiding disk writing and indexing in a disk cluster required by data splitting, and further increasing the transmission speed on the network.

Figure 5:
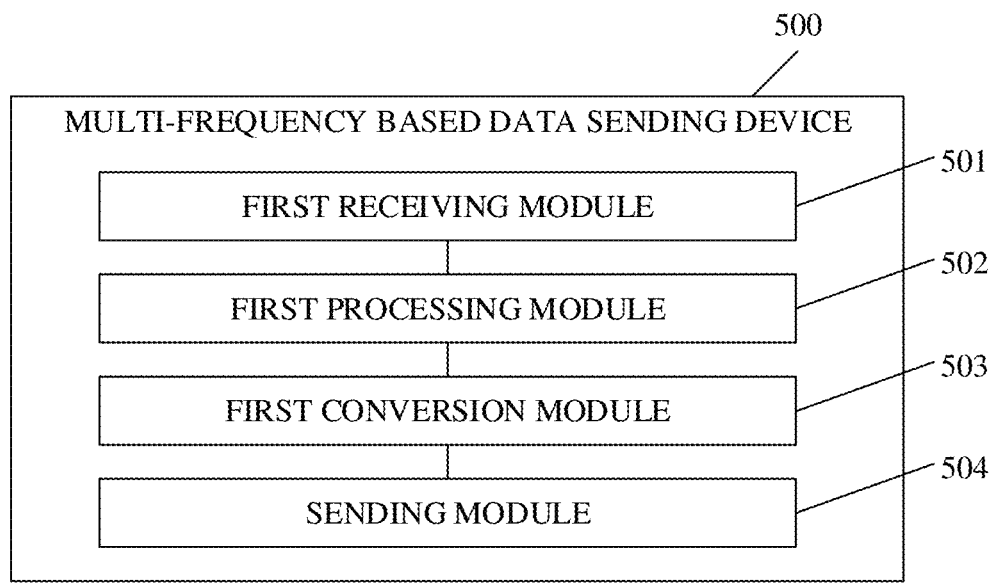
FIG. 5 is a block diagram illustrating functional modules of a multi-frequency based data sending device provided in embodiments of the disclosure.

Referring to FIG. 5, FIG. 5 is a block diagram illustrating functional modules of a multi-frequency based data sending device provided in embodiments of the disclosure. As illustrated in FIG. 5, a multi-frequency based data sending device 500 includes a first receiving module 501, a first processing module 502, a first conversion module 503, and a sending module 504. The first receiving module 501 is configured to obtain data to-be-sent. The first processing module 502 is configured to obtain binary data by performing binary conversion on the data to-be-sent, obtain at least one data fragment by performing data segmentation on the binary data, determine at least one sending frequency according to the number of bits of each of the at least one data fragment, and determine a sending frequency corresponding to each of the at least one data fragment from the at least one sending frequency according to an arrangement position of each of the at least one data fragment in the binary data. The first conversion module 503 is configured to obtain at least one conversion result by performing data conversion on each of the at least one data fragment according to a preset conversion table and the sending frequency corresponding to each of the at least one data fragment, where the conversion table records conversion results corresponding to different data fragments at different sending frequencies, and the at least one conversion result is in one-to-one correspondence with the at least one data fragment. The sending module 504 is configured to send each of the at least one conversion result to a data receiving end in order at the sending frequency corresponding to each of the at least one conversion result.

In embodiments of the disclosure, the first processing module 502 configured to obtain the at least one data fragment by performing data segmentation on the binary data is specifically configured to: determine a segmentation bit number n; and divide the binary data into the at least one data fragment according to the segmentation bit number n, where the at least one data fragment has the same number of bits, the number of bits of each of the at least one data fragment is n.

In embodiments of the disclosure, the first processing module 502 configured to determine the at least one sending frequency according to the number of bits of each of the at least one data fragment is specifically configured to: determine a first quantity according to the number of bits of each of the at least one data fragment, where the first quantity is equal to the number of bits of each of the at least one data fragment; and select the first quantity of sending frequencies randomly from a preset sending-frequency library as the at least one sending frequency.

In embodiments of the disclosure, the sending module 504 configured to send each of the at least one conversion result to the data receiving end in order at the sending frequency corresponding to each of the at least one conversion result is specifically configured to: determine at least one index according to an arrangement position of a data fragment corresponding to each of the at least one conversion result in the binary data, where the at least one index is in one-to-one correspondence with the at least one conversion result; generate at least one description file according to the index and the sending frequency corresponding to each of the at least one conversion result, where the description file records a corresponding name of the sending frequency corresponding to each of the at least one conversion result and an arrangement position of each of the at least one conversion result in the data to-be-sent, and the at least one description file is in one-to-one correspondence with the at least one conversion result; obtain at least one conversion data by encapsulating each of the at least one conversion result and a description file corresponding to each of the at least one conversion result; and send each of the at least one conversion data to the data receiving end in order at the sending frequency corresponding to each of the at least one conversion data.

Figure 6:
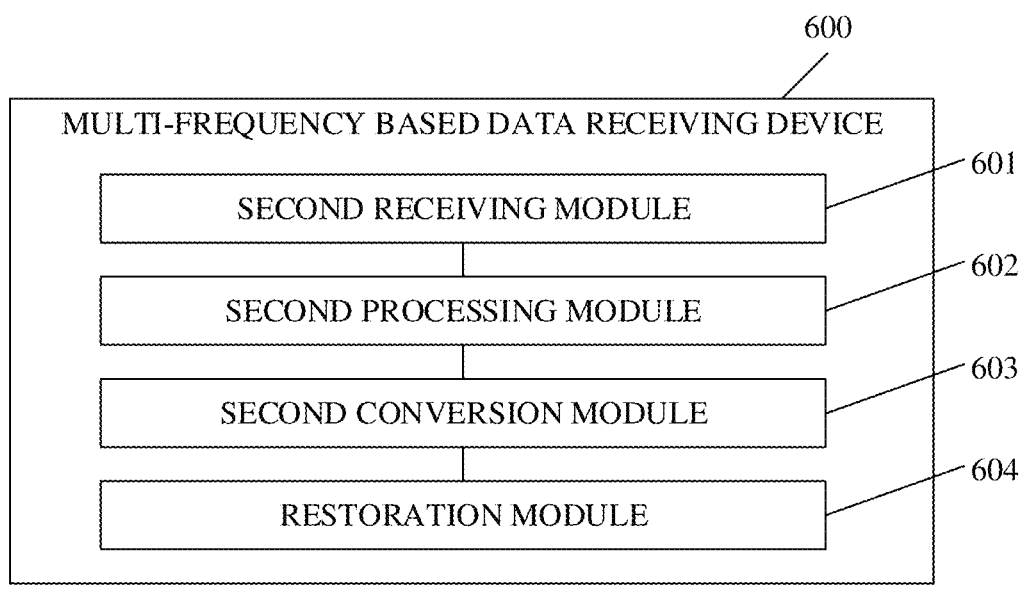
FIG. 6 is a block diagram illustrating functional modules of a multi-frequency based data receiving device provided in embodiments of the disclosure.

Further, referring to FIG. 6, FIG. 6 is a block diagram illustrating functional modules of a multi-frequency based data receiving device provided in embodiments of the disclosure. As illustrated in FIG. 6, a multi-frequency based data receiving device 600 includes a second receiving module 601, a second processing module 602, a second conversion module 603, and a restoration module 604. The second receiving module 601 is configured to receive at least one data to-be-converted from a data sending end, where each of the at least one data to-be-converted contains a conversion result and a description file. The second processing module 602 is configured to determine, according to the description file, a sending frequency and an index corresponding to each conversion data. The second conversion module 603 is configured to obtain at least one data fragment by performing inverse conversion on a conversion result corresponding to each conversion data according to a preset conversion table and a sending frequency of each conversion data, where the conversion table records conversion results corresponding to different data fragments at different sending frequencies, and the at least one data fragment is in one-to-one correspondence with at least one conversion result. The restoration module 604 is configured to obtain original data by arranging and combining the at least one data fragment according to the index corresponding to each of the at least one data fragment.

Figure 7:
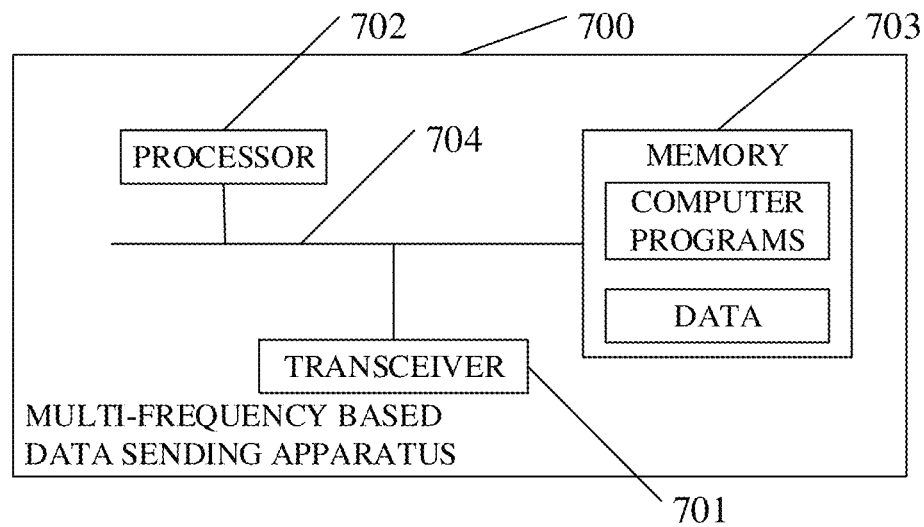
FIG. 7 is a schematic structural diagram illustrating a multi-frequency based data sending apparatus provided in embodiments of the disclosure.

Referring to FIG. 7, FIG. 7 is a schematic structural diagram illustrating a multi-frequency based data sending apparatus provided in embodiments of the disclosure. As illustrated in FIG. 7, a multi-frequency based data sending apparatus 700 includes a transceiver 701, a processor 702, and a memory 703. The transceiver 701, the processor 702, and the memory 703 are connected to each other via a bus 704. The memory 703 stores computer programs and data, and can send the data stored in the memory 703 to the processor 702. The processor 702 is configured to read the computer programs in the memory 703 to perform the following operations: obtaining data to-be-sent; obtaining binary data by performing binary conversion on the data to-be-sent; obtaining at least one data fragment by performing data segmentation on the binary data; determining at least one sending frequency according to the number of bits of each of the at least one data fragment; determining a sending frequency corresponding to each of the at least one data fragment from the at least one sending frequency according to an arrangement position of each of the at least one data fragment in the binary data; obtaining at least one conversion result by performing data conversion on each of the at least one data fragment according to a preset conversion table and the sending frequency corresponding to each of the at least one data fragment, where the conversion table records conversion results corresponding to different data fragments at different sending frequencies, and the at least one conversion result is in one-to-one correspondence with the at least one data fragment; and sending each of the at least one conversion result to a data receiving end in order at the sending frequency corresponding to each of the at least one conversion result.

In embodiments of the disclosure, the processor 702 configured to perform the operations of obtaining the at least one data fragment by performing data segmentation on the binary data is specifically configured to perform the following operations: determining a segmentation bit number n; and dividing the binary data into the at least one data fragment according to the segmentation bit number n, where the at least one data fragment has the same number of bits, the number of bits of each of the at least one data fragment is n.

In embodiments of the disclosure, the processor 702 configured to perform the operations of determining the at least one sending frequency according to the number of bits of each of the at least one data fragment is specifically configured to perform the following operations: determining a first quantity according to the number of bits of each of the at least one data fragment, where the first quantity is equal to the number of bits of each of the at least one data fragment; and selecting the first quantity of sending frequencies randomly from a preset sending-frequency library as the at least one sending frequency.

In embodiments of the disclosure, the processor 702 configured to perform the operations of sending each of the at least one conversion result to the data receiving end in order at the sending frequency corresponding to each of the at least one conversion result is specifically configured to perform the following operations: determining at least one index according to an arrangement position of a data fragment corresponding to each of the at least one conversion result in the binary data, where the at least one index is in one-to-one correspondence with the at least one conversion result; generating at least one description file according to the index and the sending frequency corresponding to each of the at least one conversion result, where the description file records a corresponding name of the sending frequency corresponding to each of the at least one conversion result and an arrangement position of each of the at least one conversion result in the data to-be-sent, and the at least one description file is in one-to-one correspondence with the at least one conversion result; obtaining at least one conversion data by encapsulating, for each of the at least one conversion result, the conversion result and a description file corresponding to the conversion result; and sending each of the at least one conversion data to the data receiving end in order at the sending frequency corresponding to each of the at least one conversion data.

Figure 8:
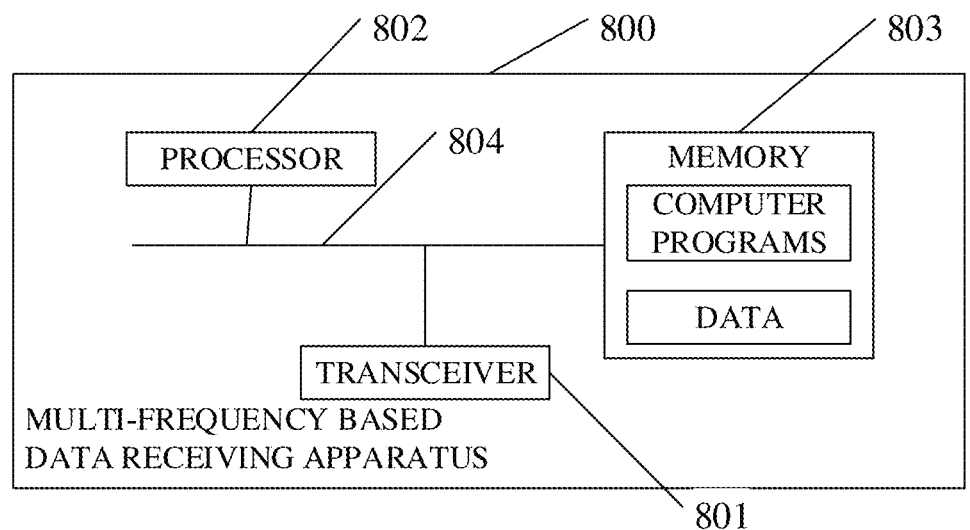
FIG. 8 is a schematic structural diagram illustrating a multi-frequency based data receiving apparatus provided in embodiments of the disclosure.

Further, referring to FIG. 8, FIG. 8 is a schematic structural diagram illustrating a multi-frequency based data receiving apparatus provided in embodiments of the disclosure. As illustrated in FIG. 8, a multi-frequency based data receiving apparatus 800 includes a transceiver 801, a processor 802, and a memory 803. The transceiver 801, the processor 802, and the memory 803 are connected to each other via a bus 804. The memory 803 stores computer programs and data, and can send the data stored in the memory 803 to the processor 802. The processor 802 is configured to read the computer programs in the memory 803 to perform the following operations: receiving at least one data to-be-converted from a data sending end, where each of the at least one data to-be-converted contains a conversion result and a description file; determining, according to the description file, a sending frequency and an index corresponding to each conversion data; obtaining at least one data fragment by performing inverse conversion on a conversion result corresponding to each conversion data according to a preset conversion table and a sending frequency of each conversion data, where the conversion table records conversion results corresponding to different data fragments at different sending frequencies, and the at least one data fragment is in one-to-one correspondence with at least one conversion result; and obtaining original data by arranging and combining the at least one data fragment according to the index corresponding to each of the at least one data fragment.

It should be understood that, the multi-frequency based data sending device and the multi-frequency based data receiving device of the disclosure each may include a smart phone (e.g., an Android® phone, an iOS® phone, a Windows® Phone), a tablet computer, a handheld computer, a laptop computer, a mobile Internet device (MID), a robot, a wearable device, etc. The above only gives some examples of the multi-frequency based data sending device and the multi-frequency based data receiving device, and is not exhaustive. The multi-frequency based data sending device and the multi-frequency based data receiving device each include, but not limited to, the examples listed above. In practice, the multi-frequency based data sending device and the multi-frequency based data receiving device each may also include an intelligent vehicle-mounted terminal, computer equipment, etc.

Through the description of the above embodiments, those skilled in the art can clearly understand that the disclosure can be implemented by means of software combined with a hardware platform. Based on such understanding, all or part of the technical solutions of the disclosure that contributes to the existing art can be embodied in the form of a software product. The (computer) software product can be stored in a storage medium (e.g., a ROM/RAM, a disk, or a CD), and includes instructions which are operable with a computer device (e.g., a personal computer, a server, or a network device) to execute the method described in the various embodiments of the disclosure or certain parts of the embodiments of the disclosure.

Embodiments of the disclosure further provide a computer-readable storage medium. The computer-readable storage medium stores computer programs which, when executed by a processor, are operable to execute all or part of the operations of the multi-frequency based data sending method and the multi-frequency based data receiving method described in the foregoing method embodiments. For instance, the storage medium may include a hard disk, a floppy disk, an optical disk, a magnetic tape, a magnetic disk, a universal serial bus (USB), a flash memory, etc.

Embodiments of the disclosure further provide a computer program product. The computer program product includes a non-transitory computer-readable storage medium storing computer programs. The computer programs are operable with a computer to execute all or part of the operations of the multi-frequency based data sending method and the multi-frequency based data receiving method described in the foregoing method embodiments.

It is to be noted that, for the sake of simplicity, the foregoing method embodiments are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the embodiments described in the specification are exemplary embodiments and the actions and modules involved are not necessarily essential to the disclosure.

In the foregoing embodiments, the description of each embodiment has its own emphasis. For the parts not described in detail in one embodiment, reference may be made to related descriptions in other embodiments.

In the embodiments of the disclosure, it should be understood that, the device/apparatus disclosed in embodiments provided herein may be implemented in other manners. For example, the device embodiments described above are merely illustrative; for instance, the division of the unit is only a logical function division and there can be other manners of division during actual embodiments, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the embodiments.

In addition, the functional units in various embodiments of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various embodiments of the disclosure. The memory includes various medium capable of storing program codes, such as a USB, a ROM, a RAM, a removable hard disk, a disk, a CD, or the like.

It will be understood by those of ordinary skill in the art that all or a part of the various methods of the embodiments described above may be accomplished by means of a program to instruct associated hardware, the program may be stored in a computer-readable memory, which may include a flash memory, a ROM, a RAM, a disk or CD, etc.

While the principles and the embodiments of the disclosure have been depicted in detail in combination with illustrative examples, it is to be understood that foregoing embodiments are merely used to help understand the method and the core idea of the disclosure. As will occur to those skilled in the art, the disclosure is susceptible to various modifications and changes without departing from the spirit of the disclosure. Therefore, the contents of the specification should not be understood as a limitation on the disclosure.

What is claimed is:

1. A multi-frequency based data sending method, performed by a data sending end and comprising:
    obtaining data to-be-sent;
    obtaining binary data by performing binary conversion on the data to-be-sent;
    obtaining at least one data fragment by performing data segmentation on the binary data;
    determining at least one sending frequency according to the number of bits of each of the at least one data fragment;
    determining a sending frequency corresponding to each of the at least one data fragment from the at least one sending frequency according to an arrangement position of each of the at least one data fragment in the binary data;
    obtaining at least one conversion result by performing data conversion on each of the at least one data fragment according to a preset conversion table and the sending frequency corresponding to each of the at least one data fragment, the conversion table recording conversion results corresponding to different data fragments at different sending frequencies, and the at least one conversion result being in one-to-one correspondence with the at least one data fragment; and sending each of the at least one conversion result to a data receiving end in order at the sending frequency corresponding to each of the at least one conversion result.

2. The method of claim 1, wherein obtaining the at least one data fragment by performing data segmentation on the binary data comprises:

determining a segmentation bit number; and dividing the binary data into the at least one data fragment according to the segmentation bit number.

3. The method of claim 2, wherein the segmentation bit number is n, the number of bits of each of the at least one data fragment is n, and n is an integer greater than 1.

4. The method of claim 2, wherein the segmentation bit number is a segmentation sequence [m, x, y], and dividing the binary data into the at least one data fragment according to the segmentation bit number comprises:

performing m-bit segmentation, performing x-bit segmentation, and performing y-bit segmentation on the binary data in order in a cyclic manner, until segmentation of the binary data is completed.

5. The method of claim 1, wherein determining the at least one sending frequency according to the number of bits of each of the at least one data fragment comprises:

determining a first quantity according to the number of bits of each of the at least one data fragment, wherein the first quantity is equal to the number of bits of each of the at least one data fragment; and selecting the first quantity of sending frequencies randomly from a preset sending-frequency library as the at least one sending frequency.

6. The method of claim 1, wherein sending each of the at least one conversion result to the data receiving end in order at the sending frequency corresponding to each of the at least one conversion result comprises:

determining at least one index according to an arrangement position of a data fragment corresponding to each of the at least one conversion result in the binary data, wherein the at least one index is in one-to-one correspondence with the at least one conversion result;

generating at least one description file according to the index and the sending frequency corresponding to each of the at least one conversion result, wherein the description file records a name of the sending frequency corresponding to each of the at least one conversion result and an arrangement position of each of the at least one conversion result in the data to-be-sent, and the at least one description file is in one-to-one correspondence with the at least one conversion result;

obtaining at least one conversion data by encapsulating, for each of the at least one conversion result, the conversion result and a description file corresponding to the conversion result; and sending each of the at least one conversion data to the data receiving end in order at the sending frequency corresponding to each of the at least one conversion data.

7. A multi-frequency based data receiving method, performed by a data receiving end and comprising:

receiving at least one conversion data from a data sending end, each of the at least one conversion data containing a conversion result and a description file;

determining, according to the description file in each of the at least one conversion data, a sending frequency and an index corresponding to each of the at least one conversion data;

obtaining at least one data fragment by performing inverse conversion on a conversion result in each of the at least one conversion data according to a preset conversion table and the sending frequency corresponding to each of the at least one conversion data, the conversion table recording conversion results corresponding to different data fragments at different sending frequencies, and the at least one data fragment being in one-to-one correspondence with at least one conversion result; and obtaining original data by arranging and combining the at least one data fragment according to the index corresponding to each of the at least one data fragment.

8. A multi-frequency based data sending apparatus, comprising:

a transceiver;

a processor, in communication connection with the transceiver; and a memory, in communication connection with the processor and storing instructions executable by the processor;

the instructions, when executed by the processor, being operable with the processor to:

obtain data to-be-sent;

obtain binary data by performing binary conversion on the data to-be-sent;

obtain at least one data fragment by performing data segmentation on the binary data;

determine at least one sending frequency according to the number of bits of each of the at least one data fragment;

determine a sending frequency corresponding to each of the at least one data fragment from the at least one sending frequency according to an arrangement position of each of the at least one data fragment in the binary data;

obtain at least one conversion result by performing data conversion on each of the at least one data fragment according to a preset conversion table and the sending frequency corresponding to each of the at least one data fragment, the conversion table recording conversion results corresponding to different data fragments at different sending frequencies, and the at least one conversion result being in one-to-one correspondence with the at least one data fragment; and cause the transceiver to send each of the at least one conversion result to a data receiving end in order at the sending frequency corresponding to each of the at least one conversion result.

9. The apparatus of claim 8, wherein the processor configured to obtain the at least one data fragment by performing data segmentation on the binary data is configured to:

determine a segmentation bit number; and divide the binary data into the at least one data fragment according to the segmentation bit number.

10. The apparatus of claim 9, wherein the segmentation bit number is n, the number of bits of each of the at least one data fragment is n, and n is an integer greater than 1.

11. The apparatus of claim 9, wherein the segmentation bit number is a segmentation sequence [m, x, y], and the processor configured to divide the binary data into the at least one data fragment according to the segmentation bit number is configured to:

perform m-bit segmentation, perform x-bit segmentation, and perform y-bit segmentation on the binary data in order in a cyclic manner, until segmentation of the binary data is completed.

12. The apparatus of claim 8, wherein the processor configured to determine the at least one sending frequency according to the number of bits of each of the at least one data fragment is configured to:
   determine a first quantity according to the number of bits of each of the at least one data fragment, wherein the first quantity is equal to the number of bits of each of the at least one data fragment; and
   select the first quantity of sending frequencies randomly from a preset sending-frequency library as the at least one sending frequency.

13. The apparatus of claim 8, wherein the processor configured to cause the transceiver to send each of the at least one conversion result to the data receiving end in order at the sending frequency corresponding to each of the at least one conversion result is configured to:
   determine at least one index according to an arrangement position of a data fragment corresponding to each of the at least one conversion result in the binary data, wherein the at least one index is in one-to-one correspondence with the at least one conversion result;
   generate at least one description file according to the index and the sending frequency corresponding to each of the at least one conversion result, wherein the description file records a name of the sending frequency corresponding to each of the at least one conversion result and an arrangement position of each of the at least one conversion result in the data to-be-sent, and the at least one description file is in one-to-one correspondence with the at least one conversion result;
   obtain at least one conversion data by encapsulating, for each of the at least one conversion result, the conversion result and a description file corresponding to the conversion result; and
   cause the transceiver to send each of the at least one conversion data to the data receiving end in order at the sending frequency corresponding to each of the at least one conversion data.

* * * * *